United States Patent [19]

Taylor

[11] 4,358,666
[45] Nov. 9, 1982

[54] WATER-BOILING CONTAINER WITH SWITCH-ON-DRY AND STEAM SENSITIVE THERMALLY RESPONSIVE CONTROL UNITS

[76] Inventor: John C. Taylor, 9 Homefield Park, Ballasalla, Castletown, Isle of Man

[21] Appl. No.: 112,798

[22] Filed: Jan. 16, 1980

[30] Foreign Application Priority Data

Jan. 15, 1979 [GB] United Kingdom ............... 7901400
Mar. 23, 1979 [GB] United Kingdom ............... 7910289

[51] Int. Cl.³ ................ H05B 1/02; H01H 37/54; H05B 3/82; A47J 27/62
[52] U.S. Cl. .................... 219/330; 219/328; 219/335; 219/337; 219/437; 219/438; 219/441; 219/512; 337/380
[58] Field of Search ............... 219/436–438, 219/441, 442, 328, 331, 330, 337, 335, 336, 512; 337/380

[56] References Cited

U.S. PATENT DOCUMENTS 3,026,402 3/1962 Russell ............... 219/441

FOREIGN PATENT DOCUMENTS 2556062 6/1975 Fed. Rep. of Germany .
1064643 4/1967 United Kingdom .
1274552 5/1972 United Kingdom .
1316436 5/1973 United Kingdom .
1401954 8/1975 United Kingdom .
1470365 4/1977 United Kingdom ............... 219/437
1542252 3/1979 United Kingdom .

Primary Examiner—A. Bartis
Attorney, Agent, or Firm—Bacon & Thomas

[57] ABSTRACT

A thermally-responsive electrical control for an electric heater of a water boiling container includes a switch-on-dry protector switch unit electrically connected with the cold leads of the heater and having a thermally sensitive switch means effective, in use, to interrupt the electrical supply to the heater should the element overheat through being switched-on when the container is dry. A removable steam-sensitive unit is mounted on the protector switch unit and includes an overcenter spring mechanism and a thermally-responsive actuator for the mechanism. The actuator of the said steam sensitive unit is arranged to impinged by vapor or steam issuing from the outlet of a passage leading to the interior of the container, and the electrical parts of the control are shielded from such vapor or steam. A mechanical link is provided between the overcenter spring mechanism and the switch means of the protector switch unit so that tripping of the overcenter spring mechanism by the actuator serves to operate the switch means of the protector switch unit. The steam-sensitive unit is optional and may be deleted to allow the switch-on-dry unit alone to control the heater.

13 Claims, 16 Drawing Figures

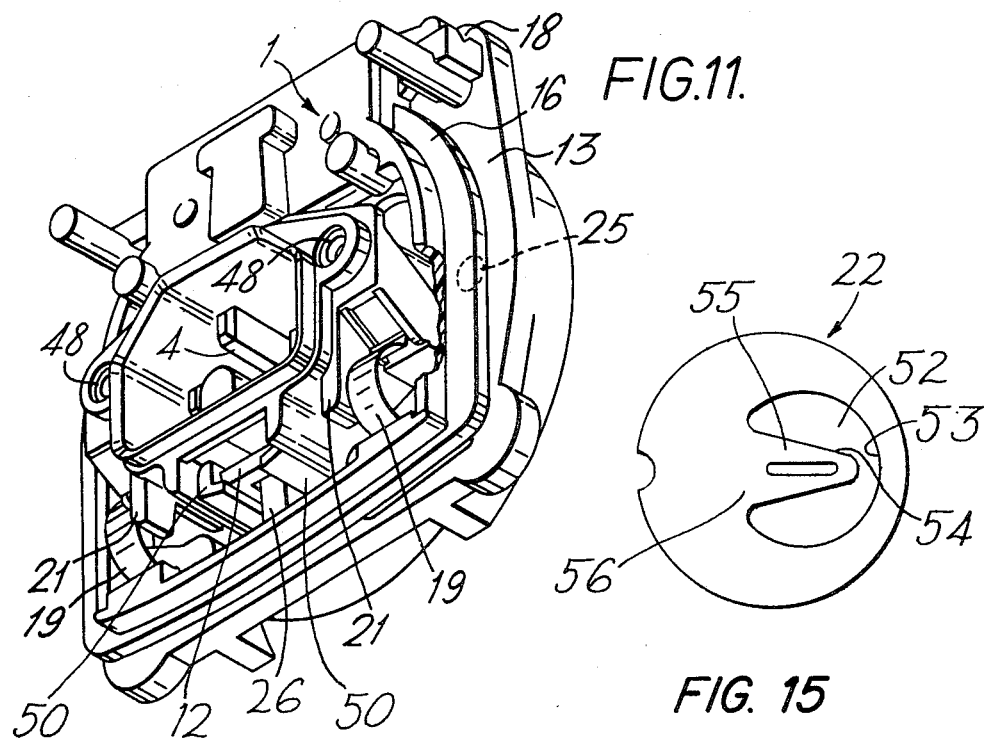
FIG. 11.
FIG. 15
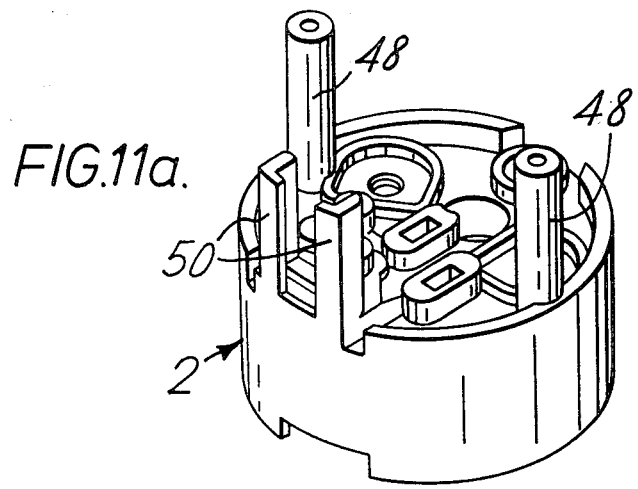
FIG. 11a.

WATER-BOILING CONTAINER WITH SWITCH-ON-DRY AND STEAM SENSITIVE THERMALLY RESPONSIVE CONTROL UNITS

BACKGROUND OF THE INVENTION

This invention relates to thermally-sensitive electrical controls for electric heaters of water boiling containers such as electric kettles, jugs, urns, pans, coffee perculators, laboratory equipment and the like (hereinafter termed containers of the kind referred to) wherein the electric heaters are either immersion heaters or similarly constructed heaters mounted externally of the container in good thermal contact with a container wall thereof e.g. as by being brazed to the underside of the bottom of the container. The heating elements of such electric heaters as aforesaid terminate in so-called cold ends by means of which electrical connections are made to the heater.

Electric immersion heaters (hereinafter termed electric immersion heaters of the first kind described) conventionally comprise a heating element carried by a head which is adapted to be secured in a water-tight manner in or adjacent an opening in the container wall. In use said head mounts externally of said container a thermally-sensitive electrical control (hereinafter termed a thermally-sensitive electrical control of the first kind described) in the form of a switch-on-dry protector switch unit which makes electrical connection with said cold ends and includes thermally-sensitive switch means effective to interrupt the electrical supply to the heater should the element overheat through being switched on dry. Switch-on-dry protector switch units per se are well known and are described in, for example, British patent specification Nos. 1,401,954 and 1,064,643.

Electric immersion heaters (hereinafter termed electric immersion heaters of the second kind described) of the first kind described are also known which additionally carry a tube for egress of vapour or steam from the interior of the container via the head of the heater, the tube being arranged, in use, so as to extend above the water level in the container. In this case the head mounts a thermally-sensitive electrical control (hereinafter termed a thermally-sensitive electrical control of the second kind described) of the first kind described which is additionally effective to interrupt the electrical supply to the heater in response to vapour or steam issuing from said tube upon the water in the container boiling. Such a thermally-sensitive electrical control of the second kind described together with an electric immersion heater of the second kind described is disclosed in British patent specification No. 1,316,436.

In the preferred embodiment of the invention described in specification No. 1,316,436 there is connected to the head firstly a protector switch unit (shown in FIGS. 3 to 5) which incorporates a thermally-sensitive switch for cutting off the power supply to the heating element if the kettle is switched on dry, and also a vapour or steam sensitive switch unit (shown in FIGS. 6 to 8) which incorporates a further thermally-sensitive switch for cutting off the power supply when vapour or steam issues through said tube.

The steam-sensitive switch unit mounts on the protector switch unit and cooperates therewith to provide a line terminal connection to the heater element via the protector switch and the steam-sensitive switch connected in series. The provision of two separate thermally-sensitive switches and their connection in series results in a control which although effective is complicated and hence expensive. Moreover although switch-on-dry protector switch units per se are well known for use in non-automatic kettles (see British patent specification Nos. 1,401,954 and 1,064,643) the construction described in specification No. 1,316,436 necessarily involves substantial modification of a standard protector switch unit thus increasing costs.

More generally it is known from British patent specification No. 1,274,552 to provide a steam or vapour tube or passage either within or along an outer surface of a water boiling container for the flow of vapour or steam from within the container to an outlet in or adjacent the container floor for the purpose of controlling a thermally-sensitive electrical control associated with an electric heater which heater may or may not be integral with the container.

Specifically described in specification No. 1,274,552 is an immersion heater of the first kind described in association with a thermally-sensitive electrical control which as with that described in specification No. 1,316,436 comprises two switch units namely a switch-on-dry protector unit and a steam or vapour sensitive unit mounted one on the other with the attendant disadvantages mentioned above in relation to the control of specification No. 1,316,436.

It is an object of the present invention to provide an improved and simplified thermally-sensitive switch-on-dry and water boiling control.

DETAILED DESCRIPTION OF THE INVENTION

Thus according to the present invention there is provided a thermally-responsive electrical control for an electric heater of a water boiling container of the kind referred to, said control including a switch-on-dry protector switch unit adapted to make electrical connection with the cold leads of the heating element and including thermally sensitive switch means effective, in use, to interrupt the electrical supply to the heater should the element overheat through being switched on when the container is dry, said control further including a steam sensitive unit adapted to be mounted on said protector switch unit, said steam-sensitive unit including an over-centre spring mechanism and a thermally-responsive actuator for said mechanism, the control being adapted for the impingement on said actuator of said steam-sensitive unit of vapour or steam issuing from the outlet of a tube or passage leading to the interior of said container, electrical parts of said control being shielded from such vapour or steam, a mechanical link being provided between said over-centre spring mechanism and the switch means of said protector switch unit so that on said over-centre spring mechanism being tripped by said actuator, said link serves mechanically to operate said switch means of the protector switch unit.

It will thus be seen that with a control according to the present invention there is only one electrical switch means namely that of the switch-on-dry protector switch unit which, as is conventional, may incorporate terminal pins whereby connection to a mains supply via a female socket connector may be made. Consequently no electrical connections have to be made between the protector switch unit and the steam-sensitive unit from which it follows that the protector switch unit can be made to be used alone as a switch-on-dry protector and yet in such a form as to be compatible for use with a simple non-electrical steam-sensitive unit when a control is required for automatic kettles or other water-boiling containers of the kind described. Thus not only is a great simplification achieved as compared with the control as described in specification Nos. 1,274,552 and 1,316,436 but the protector switch unit may serve two functions, one by itself as a dry-switch-on protector and another as part of the composite switch-on-dry and boiling control according to the present invention.

The manner of adaptation of the control for the impingement of steam or vapour on said actuator can take various forms. Thus for use with immersion heaters of the second kind described, the switch-on-dry protector switch unit will be adapted to engage said tube for steam or vapour so that steam or vapour passes through the protector unit to reach said steam sensitive unit. Alternatively provision may be made for steam or vapour to be fed directly to the steam sensitive unit e.g. laterally and from above as viewed when the control is fitted to the side and adjacent the base of a water-boiling container of the kind referred to.

In order to provide a versatile control provision may be made both for the tube of an immersion heater of the second kind described and for steam or vapour to be fed directly to the steam sensitive unit. The control may be provided in a form in which for use with an immersion heater of the second kind described there is provided frangible means defining an opening to receive said steam or vapour carrying tube. Alternatively, whilst the control may be adapted to receive said tube, the path for steam or vapour to said steam sensitive unit may be made readily blocked off by the user as, depending on the design of the control, might be necessary to prevent steam or vapour fed directly to the steam sensitive unit passing via said path into the electrics of the protector switch unit.

A control according to the invention adapted for the direct introduction of steam or vapour to the steam-sensitive unit from above as mentioned previously can conveniently receive steam or vapour via a tube or passage running down the outside of the container and communicating with a steam or vapour aperture in the upper wall of the container. Such a tube can be concealed or formed within a handle structure of the container. Likewise a steam or vapour passage can readily be defined between the container wall and a handle structure. With such arrangements an electric immersion heater of the first kind described, which is simpler to manufacture and install than one of the second kind described, is all that is required.

The control according to the present invention is not however restricted to immersion heaters but is applicable to containers with external heaters. In such case, there being conventionally no head associated with the heater element, it will be necessary to provide a mounting plate for said protector switch unit and to arrange the cold ends of said heater element in relation to said plate so that in mounting said protector switch unit on said plate, electrical connections can be made with the cold ends. The plate will also need to be mounted so that, as with the head of an immersion heater, its temperature will rise with that of the heater element should a switch-on-dry condition arise. Thus the mounting plate may conveniently be in the form of a bracket mounted on the heater element or on the base of the container adjacent the heater element. In this way the switch-on-dry control function can readily be exercised particularly as the temperature rise of an element in good thermal contact with the container wall is much less rapid than with an immersion heater since the container acts as a heat sink.

Steam or vapour may be led to the control via a steam tube exiting from said container, which tube may engage the protector switch unit in like manner as with controls for use with electric immersion heaters of the second kind described. Alternatively the arrangement may be as described above with the tube or passage running down the outside of the container directly to communicate with the steam sensitive unit.

Preferably, the over-centre mechanism comprises a lever pivotably mounted on a body member of the steam-sensitive unit so as to be movable between first and second positions through an unstable dead-centre position. The pivotal mounting is preferably by means of at least one knife edge resting in a notch or bearing, the knife edge being retained in the notch by means of at least one C-spring extending between the lever and the body member. In such an arrangement, the dead-centre position occurs when the two ends of the C-spring lie in a common plane with the fulcrum of the lever.

The mechanical link preferably comprises a movable member which is acted on directly or indirectly by a lever of the over-centre mechanism and by a thermally responsive actuator of the switch unit. The movable member is preferably an elongate member movable in the direction of its axis, the lever comprising a portion extending through an aperture in the elongate member so as to engage therewith to operate said switch means.

There is further provided the combination of a thermally-sensitive electrical control according to the invention and an electric immersion heater of the second kind described, wherein a hot return of the heating element is in thermal contact with the head in a position which, in use, is below the cold leads of the heating element, a thermally-sensitive actuator of the thermally-sensitive switch means being in thermal contact with the head in the vicinity of said position.

A preferred form of thermally-sensitive electrical control according to the invention for an electric heater of the second kind described will now be described with reference to FIGS. 1 to 7 of the accompanying drawings.

There will further be described with reference to FIGS. 8 to 14 of the accompanying drawings a slightly modified version of the first described control whereby steam or vapour may also be fed directly to the steam sensitive unit and the application of this modified control to a heater mounted externally of the container as well as to a kettle having an immersion heater of the first kind described i.e. without a steam tube.

BRIEF DESCRIPTION OF THE DRAWINGS

In the accompanying drawings wherein like parts bear the same reference numerals;

FIG. 5 is a view corresponding to that of FIG. 4, but with the housing removed;

FIG. 11 is a perspective view from below and to one side of the control itself without its outer housing;

FIG. 11a is a perspective view of the body moulding of the switch-on-dry protector unit of the control;

FIG. 15 is a plan view of a thermally-responsive bimetal actuator.

DETAILED DESCRIPTION OF THE DRAWINGS

Figure 1:
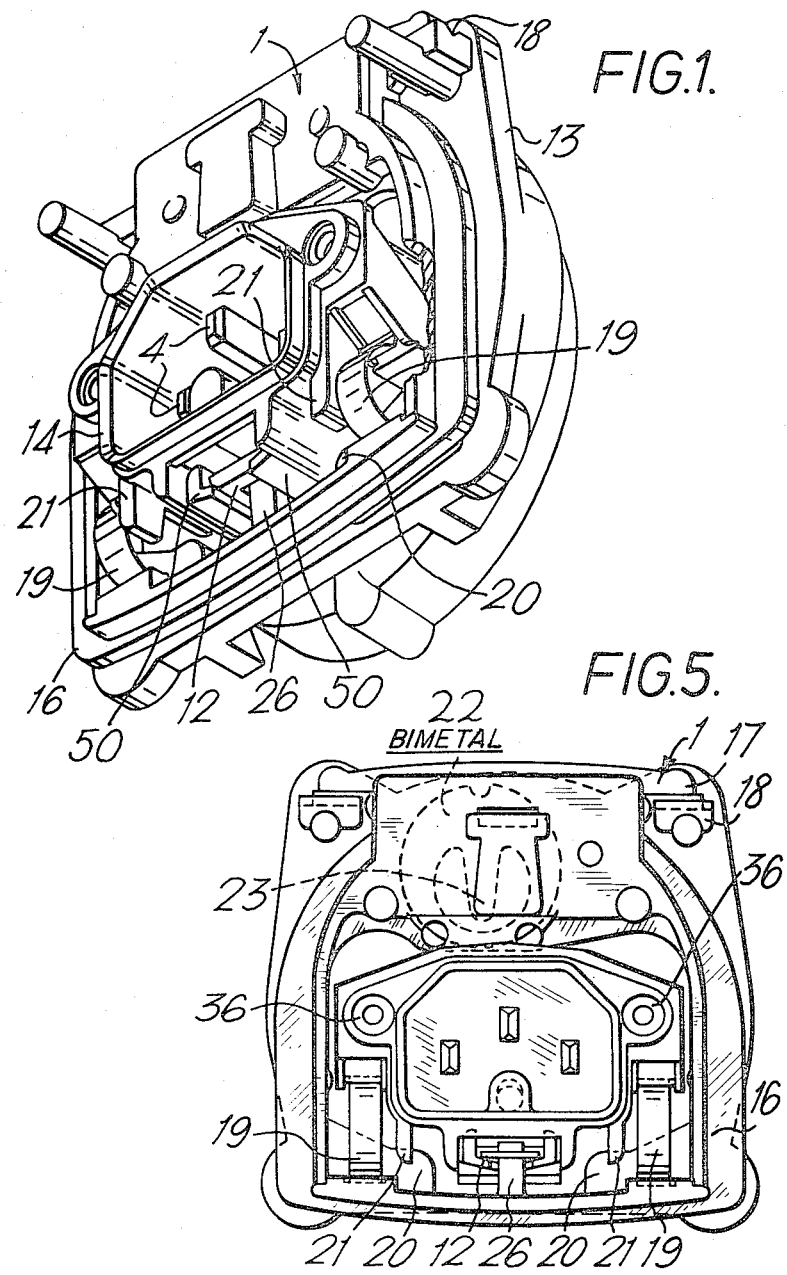
FIG. 1 is a perspective view from below and to one side of an embodiment of a thermally-sensitive electrical control according to the invention, the housing of the control being removed.
Figure 2:
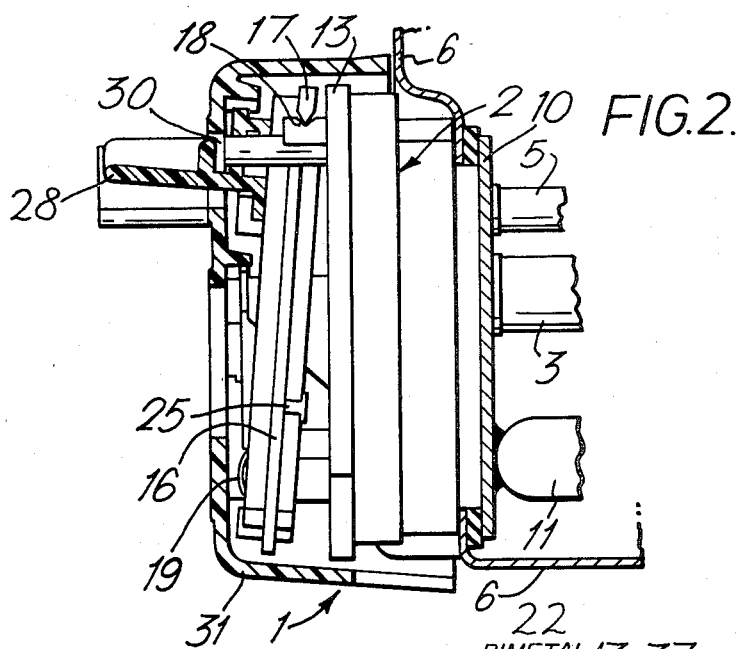
FIG. 2 is a side view of the control shown in FIG. 1 with the housing in place.

As shown in FIGS. 1 to 5 of the drawings, a thermally-sensitive electrical control is mounted on the head 10 of an electrical immersion heater. The head is secured in a water-tight manner in an opening in the wall of a kettle 6. The head 10 carries a steam tube 5 for conducting steam from the interior of the kettle to the thermally-sensitive control. The tube 5 is arranged so as to extend in use above the water level in the kettle. The immersion heater comprises two cold ends 3 and a hot return 11 which passes underneath the cold ends 3 and is brazed to the head 10 so as to be in thermal contact therewith. By virtue of the proximity of the hot return to the base of the kettle, the kettle is capable of boiling a small quantity of water if desired.

Figure 3:
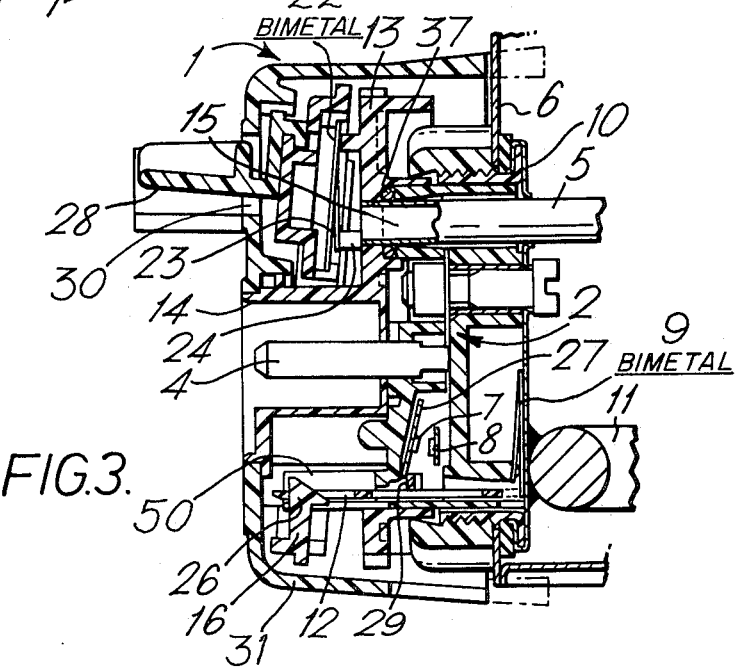
FIG. 3 is a view corresponding to that of FIG. 2, but showing a cross-section.
Figure 4:
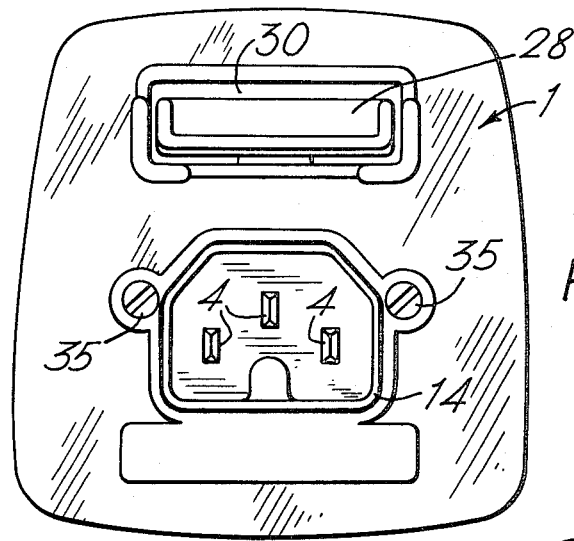
FIG. 4 is a front elevation of the control of FIGS. 2 and 3.

The thermally-sensitive electrical control comprises a switch-on-dry protector switch unit 2 mounted on the head 10 and a steam-sensitive unit 1 which is in turn mounted on the switch unit 2. The switch unit 2 is provided with three pins 4, including a line pin, a neutral pin and an earth pin, for connection to a female socket to supply mains electrical power to the heating element. The line pin is connected to one of the cold ends 3 via a pair of electrical contacts including a movable contact 7 mounted on a resilient conductive strip 27 and a stationary contact 8 (FIG. 3). When the contacts are separated, the supply of electrical current to the heating element is cut off. A bimetallic actuator 9 of the type disclosed in Offenlegungsschrift No. 2,556,062 is provided in the protector switch unit, the tongue of the actuator being riveted to a pillar of the unit, and the main body of the actuator being in thermal contact with the head 10 in the "cold" position of the actuator. A mechanical link in the form of an elongate member 12 is mounted in the protector switch unit 2 so as to be slidable in its axial direction, the member 12 including an upwardly extending stop 29 adapted to engage the lower end of the resilient strip 27. Thus, when the kettle is switched on dry, that is without the heating element being covered by water, so that the temperature of the element rises above its normal working temperature to, say 120° C., the actuator 9 reverses its curvature with a snap action, moving the member 12 leftwardly as shown in FIG. 3, thereby moving the movable contact 7 away from the fixed contact 8.

The steam-sensitive unit 1 comprises a body member 13 which seats over the switch unit 2. The body member 13 has apertures therethrough for the pins 4 and includes a shroud 14 which surrounds the pins and guides the female socket in use. An aperture 15 through the body member 13 receives the end of the steam tube 5 and is sealed thereto by an O-ring seal 37. A lever member 16 is pivotably mounted on the body member 13 by means of two knife edges 17 formed integrally with the member 16 resting in notches 18 formed integrally with the member 13. Two over-centre C-springs 19 extend between notches formed in the lever member and body member respectively and bias the knife edges into engagement with the notches. The lever member 16 is pivotable between a first position in which two stops 25 provided on the lever member 16 are in contact with the face of the body member 13 and a second position (as shown in the drawings) in which two portions 20 of the member 16 came into contact with two pillars 21 formed on the shroud 14. In passing from one to the other position, the lever passes through an unstable dead centre position in which the two ends of each of the C-springs and the knife edge pivots are all in a common plane.

A bimetallic actuator 22 similar to the actuator 9 is mounted by means of the rim of its domed area on the lever member 16. In a preferred embodiment, the thermally-responsive actuator of the steam-sensitive unit comprises a bimetallic element 22. The bimetallic element 22 preferably comprises a member of sheet bimetal having an aperture 52 with an outer perimeter 53 and an inner perimeter 54 defining a tongue 55 free at one end intermediate two lobe portions of said aperture, said inner perimeter 54 and arcuate portions of said outer perimeter 53 smoothly merging at rounded ends of the aperture adjacent the tongue root 56, the tongue being, at least in part, generally centrally disposed with respect to the member, the member having been deformed in a die pressing operation to conform in shape to a die of domed configuration, said domed area being such as to reverse its curvature with a snap action with change in temperature, the width of the domed area being greatest in the region of the tongue root 56. Such an actuator is described in German Offenlegungsschrift No. 2,556,062 and British Patent Specification No. 1,542,252. The actuator is orientated so that its tongue 23 bears against a pillar 24 formed on the body member 13 in its "hot" position. When the kettle boils, steam issues from the steam tube 5 and impinges on the actuator 22. The actuator then reverses its curvature with a snap action, so that its tongue 23 bears against the pillar 24, thus moving the lever member 16 from its first to its second position. A portion 26 of the lever extends through an aperture in the elongate member 12. Thus, when the lever moves from its first to its second position, the portion 26 of the lever engages the member 12 and slides it leftwardly as shown in FIG. 3, thereby separating the contacts 7,8 as described above. The effect is that when the kettle boils, the lever 16 is tripped by the actuator 22 from its first to its second position, thus interrupting the supply of electricity to the heating element. When the actuator 9 of the protector switch unit separates the contacts 7, 8, the movement of the member 12 trips the lever 16 so that it moves from its first to its second position thus retaining the contacts in their separated position.

A knob 28 is mounted on the lever member 16 and extends through an aperture 30 in a housing 31 surrounding the thermally-sensitive control, for manually resetting the control. When the knob 28 is pressed downwardly, the lever member 16 is returned to its first position, thus allowing the resilient strip 27 to move the movable contact 7 into electrical contact with the fixed contact 8. The supply of current to the heating element can then be resumed. At the same time, the resilient strip 27 shifts the member 12 in the rightward direction as shown in FIG. 3.

Thus, the parts of the control which carry electricity in use are all carried by the dry-switch-on protector unit 2 and are shielded from the steam issuing from the steam tube 5 by the body of the steam-sensitive unit 1, a mechanical link being provided between the over-centre mechanism and the switch means of the protector switch unit.

Figure 6:
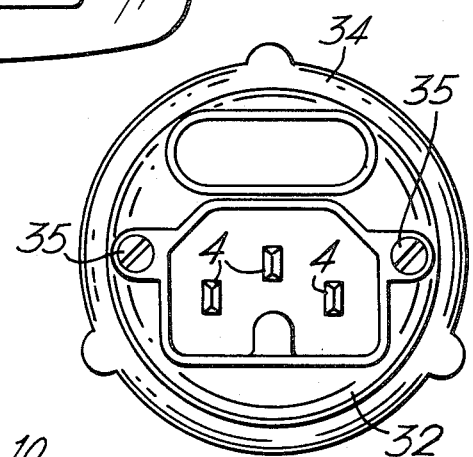
FIG. 6 is a front elevation of a switch-on-dry protector switch unit forming part of the control shown in FIGS. 1 to 5.
Figure 7:
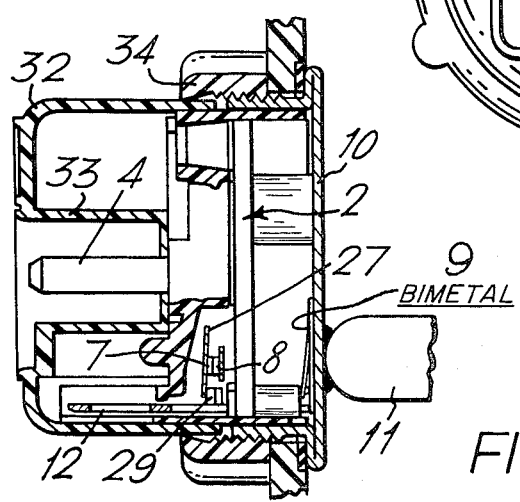
FIG. 7 is a side view of the switch unit shown in FIG. 6.

Referring now to FIGS. 6 and 7 of the drawings there is shown the switch-on-dry protector switch unit of FIGS. 1 to 5, but used without the steam-sensitive switch. The element on which this unit is mounted will thus be protected if the kettle is switched on dry or allowed to boil dry, but will not be switched off automatically when the kettle boils. The unit 2 is mounted on the head 10 without modification and is enclosed by a housing 32 which includes a portion 33 forming a shroud for the pins 4. The housing 32 is secured to the head 10 by means of an internally threaded ring 34 and the switch unit is secured to the housing by two screws 35 which enter two pillars 36 formed on the switch unit 2, as is the housing of the control of FIGS. 1 to 5.

It will thus be seen that the mechanical steam-sensitive switch unit of the present invention enables the use of a protector switch unit which can be used in either an automatic or non-automatic kettle without modification. The unit costs of the switch unit can thus be reduced.

Figure 8:
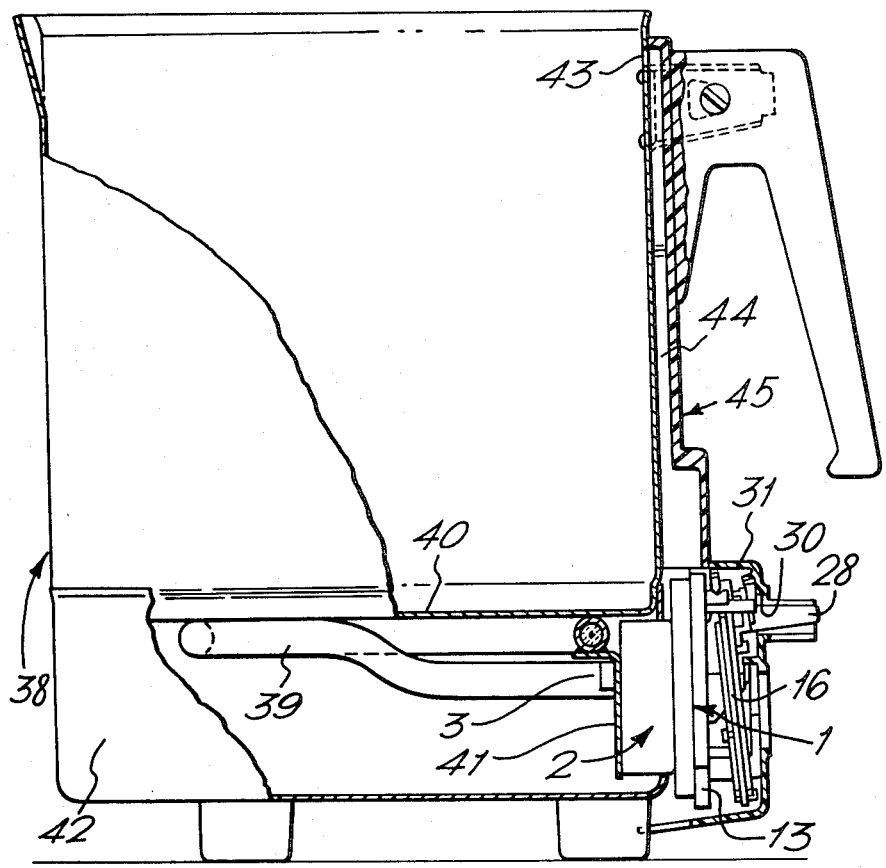
FIG. 8 is a side elevation partially in section of a water-boiling jug whose heater is brazed to the underside of the base of the jug and fitted with a modified control according to the invention wherein steam or vapour is introduced directly to the steam-sensitive unit of the control.
Figure 13:
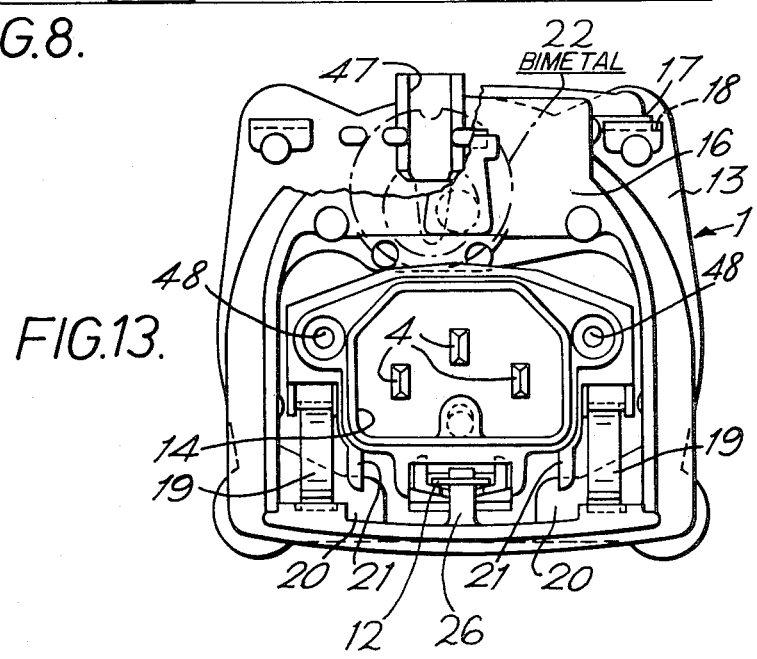
FIGS. 12 and 13 are front elevations of the control respectively with and without an outer housing in place.

As shown in FIG. 8 of the drawings, the thermally-sensitive electrical control 1, 2 is fitted to a jug 38 having an electrical heater 39 brazed to the underside of the bottom 40 of the jug. The control 1,2 is mounted on a bracket 41 brazed to a heated portion of the heater element, the bracket being provided in like manner as the head of an immersion heater with a mounting stud whereby the control is mounted thereto. A detachable base 42 of the jug encloses the heater 39, an opening in the side of the base 42 being provided to receive the control 1,2. A lid (not shown) is provided for the jug 38 and a steam or vapour venting aperture 43 is provided at the top of the side wall. This aperture 43 communicates with a passage 44 defined between a handle structure 45 and the jug wall. The passage 44 leads directly to the control 1,2 so that when water boils in the jug and the lid is in place steam or water vapour is directed to the control 1,2.

Figure 9:
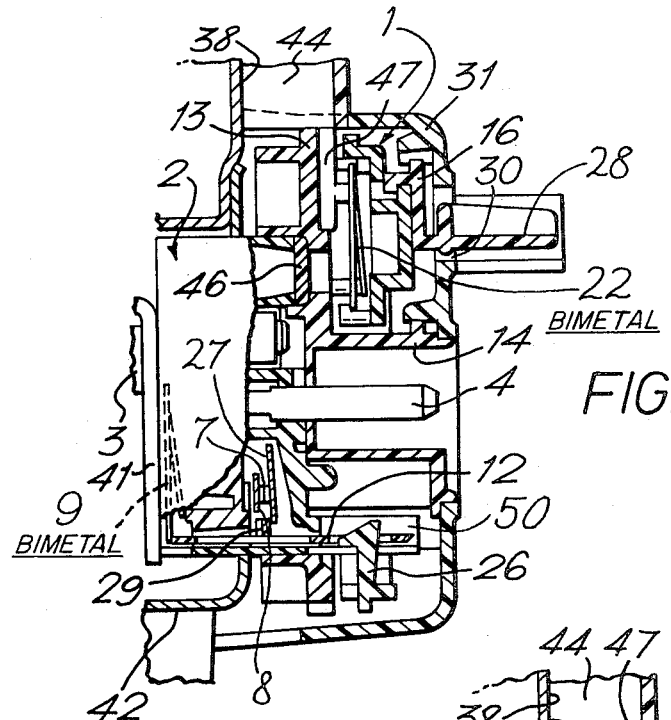
FIGS. 9 and 10 are side elevations in cross-section of the control as fitted in the jug.
Figure 10:
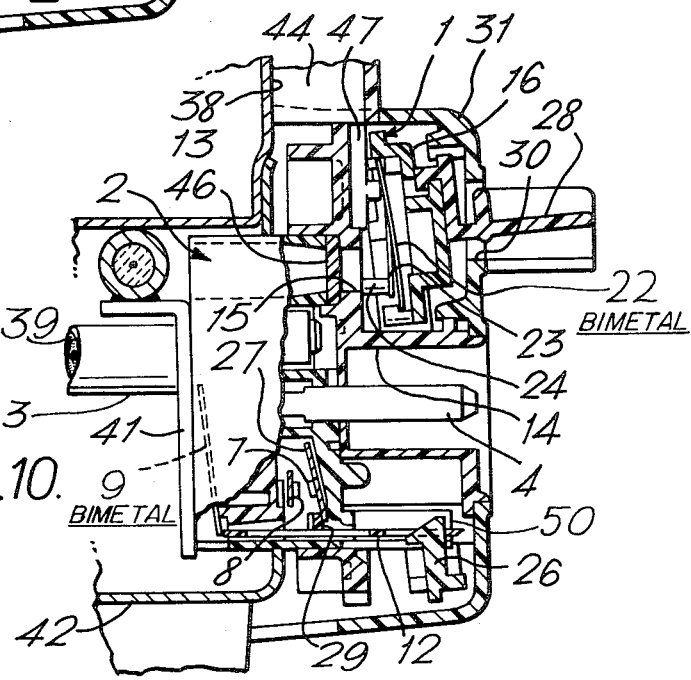
Figure 12:
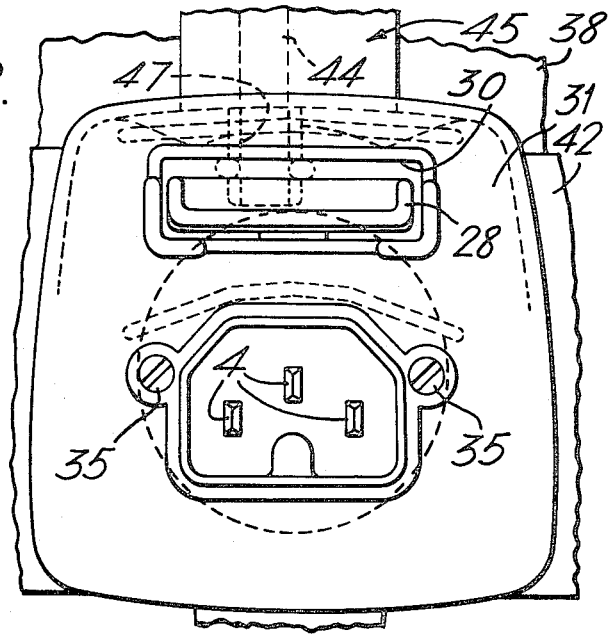

Referring additionally to FIGS. 9 to 13 the thermally-sensitive electrical control comprises a switch-on-dry protector switch unit 2 mounted on the bracket 41 and a steam-sensitive unit 1 which is in turn mounted on the switch unit 2. The switch unit 2 is provided with three pins 4, including a line pin, a neutral pin and an earth pin, for connection to a female socket to supply mains electrical power to the heating element. The line pin is connected to one of the cold leads 3, which extend through the bracket 41, via a pair of electrical contacts including a movable contact 7 mounted on a resilient conductive strip 27 and a stationary contact 8 (FIGS. 9 and 10). When the contacts are separated, the supply of electrical current to the heating element is cut off. A bimetallic actuator 9 of the type disclosed in Specification No. 1,542,252 is provided in the protector switch unit, the tongue of the actuator being riveted to a pillar of the unit, and the main body of the actuator being in thermal contact with the bracket 41 in the "cold" position of the actuator. A mechanical link in the form of an elongate member 12 is mounted in the protector switch unit 2 so as to be slidable in its axial direction, the member 12 including an upwardly extending stop 29 adapted to engage the lower end of the resilient strip 27. Thus, when the jug is switched on dry, that is without any water in the jug, so that the temperature of the element rises above its normal working temperature, the actuator 9 is heated above its operating temperature by conduction of heat through bracket 41 and actuator 9 reverses its curvature with a snap action, moving the member 12 rightwardly as shown in FIGS. 9 and 10, thereby moving the movable contact 7 away from the fixed contact 8.

The steam-sensitive unit 1 includes a body member 13 which seats over the switch unit 2. The body member 13 has apertures therethrough for the pins 4 and includes a shroud 14 which surrounds the pins and guides a female socket in use. An aperture 15 is provided through the body member 13 capable of receiving a steam tube leading from the interior of the jug but in this case is blocked off by a plug 46. A lever member 16 of unit 1 is pivotably mounted on the body member 13 by mean of two knife edges 17 formed integrally with the member 16 resting in notches 18 formed integrally with the member 13. Two over-centre C-springs 19 extend between notches formed in the lever member and body member respectively and bias the knife edges 17 into engagement with the notches 18. The lever member 16 is pivotable between a first position in which two stops 25 provided on the lever member 16 are in contact with the face of the body member 13 and a second position (as shown in the drawings) in which two portions 20 of the member 16 come into contact with two pillars 21 formed on the shroud 14. The stops 25 are provided on the lever member in the proximity of the notches on the lever member for the two C-springs 19. Thus, a certain degree of warping or inaccurate formation of the lever member 16 does not affect the operation of the over-centre mechanism in view of the fact that any change in the distance between the knife edges 17 and the stops 25 owing to warping of the lever member is taken up by a similar change in the distance between the notch for the C-spring and the knife edge fulcrum. In passing from one to the other position, the lever passes through an unstable dead centre position in which the two ends of each of the C-springs and the knife edge pivots are all in a common plane.

A bimetallic actuator 22 similar to the actuator 9 is mounted by means of the rim of its domed area on the lever member 16. The actuator is orientated so that its tongue 23 bears against a pillar 24 formed on the body member 13 in its "hot" position. When the water in the jug boils, steam or vapour issues from the aperture 43 passes along passage 44 and impinges on the actuator 22 as described hereinafter. The actuator then reverses its curvature with a snap action, so that its tongue 23 bears against the pillar 24, thus moving the lever member 16 from its first (FIG. 9) to its second position (FIG. 10). A portion 26 of the lever 16 extends through an aperture in the elongate member 12. Thus, when the lever moves from its first to its second position, the portion 26 of the lever engages the member 12 and slides it rightwardly as shown in FIGS. 9 and 10, thereby separating the contacts 7,8 as described above. The effect is that when the water boils, the lever 16 is tripped by the actuator 22 from its first to its second position, thus interrupting the supply of electricity to the heating element. When the actuator 9 of the protector switch unit separates the contacts 7,8, the movement of the member 12 also trips the lever 16 so that it moves from its first to its second position thus retaining the contacts in their separated position (see FIG. 10).

A knob 28 is mounted on the lever member 16 and extends through an aperture 30 in a housing 31 surrounding the thermally-sensitive control, for manually resetting the control. When the knob 28 is pressed downwardly, the lever member 16 is returned to its first position, thus allowing the resilient strip 27 to move the movable contact 7 into electrical contact with the fixed contact 8. The supply of current to the heating element can then be resumed. At the same time, the resilient strip 27 shifts the member 12 in the leftward direction as shown in FIGS. 10 and 11.

As shown in FIGS. 10 to 13 the upper part of the body member 13 is adapted to provide a steam or vapour channel 47 open upwardly to communicate with passage 44 and laterally to direct steam or vapour toward actuator 22.

Plug 46 prevents passage of steam or vapour into the switch-on-dry protector unit 2 and pins 4 are shielded from the steam issuing from the channel 47 by the shroud of the steam-sensitive unit 1, a mechanical link being provided between the over-centre mechanism and the switch means of the protector switch unit.

Housing 31 is secured to the unit 2 by screws 35 which engage internally threaded pillars 48 on the unit 2 (FIG. 11a), these pillars extending through apertures in body member 13, thus securing steam-sensitive unit 1 on unit 2. FIG. 11a also shows clearly the integral protective guides 50 for the link member 12.

Figure 14:
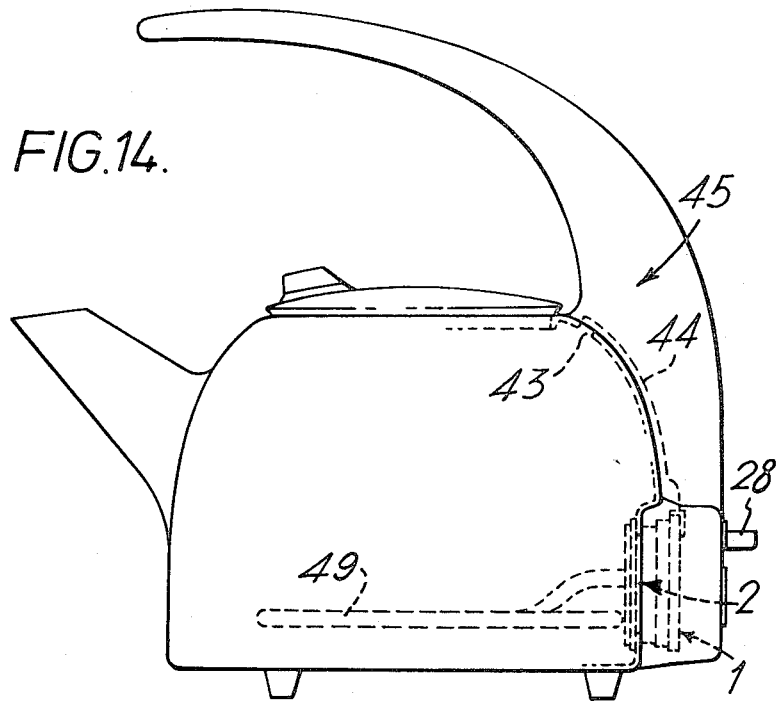
FIG. 14 is a side elevation of an electric kettle fitted with a control as shown in FIGS. 8 to 13.

Referring to FIG. 14 there is shown the control of FIGS. 8 to 13 fitted to an electric kettle having an immersion heater 49, the control being mounted in conventional manner on the heater head 10, the head likewise being secured in conventional manner in a watertight fashion in an opening in the wall of the kettle. An aperture 43 is provided in the kettle wall and a passage 44 is defined between the handle structure 45 and the kettle wall whereby steam or vapour issuing from aperture 43 is led to the steam unit 7 in like manner as with the water boiling jug.

I claim:

1. In a water boiling container having an electric heating element for heating liquid contained therein, the improvement comprising a thermally-responsive electrical control for controlling operation of said heating element, said control including a switch-on-dry protector switch unit enclosed by a first housing and adapted to make electrical connection with the cold ends of said electric heating element of said container and including thermally sensitive switch means effective, in use, to interrupt the electrical supply to the heating element should the element overheat through being switched on when the container is dry, said control further including a steam-sensitive unit enclosed by a second, separate housing removably mounted on said protector switch unit housing, said steam-sensitive unit including an overcentre spring mechanism and a thermally-responsive actuator for operating said mechanism, the control including means for the impingement on said actuator of said steam-sensitive unit of vapor or steam issuing from the outlet of a passage leading to the interior of the container, the electrical parts of said protector switch unit being shielded from such vapor or steam by a body portion of said steam-sensitive unit, a mechanical link being provided between said overcentre spring mechanism of said steam-sensitive unit and the switch means of said protector switch unit so that on said overcentre spring mechanism being tripped by said actuator, said link serves mechanically to operate said switch means of the protector switch unit, said protector switch unit and said first housing being separable from said steam-sensitive unit whereby said first housing and protector switch unit can be mounted on a container in the absence of said steam-sensitive unit.

2. A control as claimed in claim 1, wherein the thermally-responsive actuator of the steam-sensitive unit comprises a bimetallic element, the bimetallic element comprising a member of sheet bimetal having an aperture with an outer perimeter and an inner perimeter defining a tongue free at one end intermediate two lobe portions of said aperture, said inner perimeter and arcuate portions of said outer perimeter smoothly merging at rounded ends of the aperture adjacent the tongue root, the tongue being, at least in part, generally centrally disposed with respect to the member, the member having been deformed in a die pressing operation to conform in shape to a die of domed configuration, said domed area being such as to reverse its curvature with a snap action with change in temperature, the width of the domed area being greatest in the region of the tongue root.

3. A control as claimed in claim 1 or 2, wherein the overcentre spring mechanism comprises a lever pivotally mounted on said body portion of the steam-sensitive unit so as to be movable between first and second positions through an unstable dead-centre position.

4. A control as claimed in claim 3, wherein the pivotal mounting comprises at least one knife edge resting in a notch, the knife edge being retained in the notch by means of at least one C-spring extending between the lever and said body portion.

5. A control as claimed in claim 3, wherein the mechanical link comprises a movable member which is acted on by said lever and by a thermally responsive actuator of the protector switch unit.

6. A control as claimed in claim 5, wherein the movable member is an elongate member movable in the direction of its length.

7. A control as claimed in claim 6, wherein the lever comprises a portion which extends through an aperture in the elongate member.

8. A control as claimed in claim 5, wherein the switch means comprises a stationary electrical contact and a movable electrical contact, the movable electrical contact being mounted on a resilient member engageable by the movable member.

9. A control as claimed in claim 8, wherein movement of the movable member by the thermally responsive actuator of the protector switch unit so as to separate the contacts moves said lever to its second position thus retaining the contacts in their separated position.

10. A control as claimed in claim 1, wherein the heating element is an immersion heater, the control is mounted on a head secured in water-tight manner adjacent an opening in the container wall, and said passage for conducting vapour or steam from the interior of the container to the thermally-responsive actuator passes through the head and through a body member of the steam-sensitive unit.

11. A control as claimed in claim 1, wherein the heating element is in thermal contact with the exterior of the container, the control is mounted on a mounting plate in thermal contact with the heater, and said passage for conducting vapour or steam from the interior of the container to the thermally-responsive actuator extends along the outside of the container.

12. A container as claimed in claim 1, wherein said passage enters the steam-sensitive unit while bypassing the switch-on-dry protector unit.

13. A thermally-responsive electrical control for an electric heater of a water boiling container, said control including a switch-on-dry protector switch unit adapted to make electrical connection with the cold ends of an electric heating element of a container and including thermally sensitive switch means effective, in use, to interrupt the electrical supply to the heating element should the element overheat through being switched on when the container is dry, said control further including a steam-sensitive unit having a body member detachably mounted on said protector switch unit, said steam-sensitive unit including an overcenter spring mechanism and a thermally-responsive actuator for operating said mechanism, the control including means for the impingement on said actuator of said steam-sensitive unit of vapour or steam issuing from the outlet of a passage leading to the interior of the container, the electrical parts of said protector switch unit being shielded from such vapour or steam by said body member of said steam-sensitive unit, a mechanical link being provided between said overcenter spring mechanism of said steam-sensitive unit and the switch means of said protector switch unit so that on said overcenter spring mechanism being tripped by said actuator, said link serves mechanically to operate said switch means of the protector switch unit, said protector switch unit being separable from said steam-sensitive unit whereby said protector switch unit can be mounted on a container in the absence of said steam-sensitive unit.

* * * * *